May 21, 1968 SEISHI TANAKA 3,383,910

HYDRAULIC DYNAMOMETER

Filed July 27, 1965 3 Sheets-Sheet 1

INVENTOR.
SEISHI TANAKA
BY Steinberg + Blake
Attys

INVENTOR.
SEISHI TANAKA
BY Stenberg + Blake
Attys

May 21, 1968 SEISHI TANAKA 3,383,910

HYDRAULIC DYNAMOMETER

Filed July 27, 1965 3 Sheets-Sheet 3

INVENTOR.
SEISHI TANAKA
BY Stevens, Davis, Miller & Mosher (signature)
Attys

United States Patent Office 3,383,910

Patented May 21, 1968

3,383,910

HYDRAULIC DYNAMOMETER

Seishi Tanaka, 109 1-chome, Sakai-Minami-machi, Musashino-shi, Tokyo, Japan

Filed July 27, 1965, Ser. No. 475,062
Claims priority, application Japan, Aug. 10, 1964, 39/44,570; Jan. 17, 1965, 40/2,079; Jan. 30, 1965, 40/4,996
16 Claims. (Cl. 73—134)

ABSTRACT OF THE DISCLOSURE

A hydraulic dynamometer wherein the resistance to turning of an outer casing is a measure of the torque applied to a rotary shaft which extends through the outer casing and which is driven by a machine whose power is to be measured. The outer casing has at least one inner wall surface situated in a plane normal to the rotary shaft and formed with an annular groove coaxially surrounding the shaft and having in its interior transverse vanes which define buckets. At least one rotary disk is fixed to the shaft for rotation therewith and has a surface separated from the above grooved wall surface of the casing by a narrow space, this surface of the disk which rotates with the shaft being formed with an annular groove of the same size as that of the groove of the wall surface and also having in its interior transverse vanes defining buckets, so that both sets of buckets communicate with each other to provide for circulation of the liquid in the grooves which communicate through the narrow space between the wall surface and disk surface. The disk has an outer periphery which is spaced from the inner surface of the casing to define therewith an annular gap communicating with the narrow space between the wall surface and the disk surface, and an impeller means which rotates with the shaft communicates with this annular gap while a liquid inlet communicates with the annular grooves of the wall and disk surfaces to supply liquid to these grooves. As a result of centrifugal force this liquid tends to flow out through the narrow space and the annular gap to the impeller means, but the rotation of the impeller means with the shaft opposes this movement and maintains a balance in the liquid at the region of the inner surface of the casing which surrounds the disk at the annular gap. An adjustable overflow outlet communicates with the impeller means for providing for overflow and discharge of the liquid from the impeller means, and this adjustable overflow is capable of adjusting the location of an overflow aperture with respect to its radial distance from the axis of the shaft, so that in this way the pressure of the liquid maintained in the region of the outer periphery of the disk is regulated and thus the operation is controlled by the adjustable overflow means.

This invention relates to an improvement in a hydraulic dynamometer of the class of the Froude type.

There has been known such various hydraulic dynamometers as the Froude type, the Junkers type, etc. of which the Froude type is representative. However, it has the following drawbacks. The Froude type hydraulic dynamometer is provided with a pair of sluice gates arranged in a narrow space between a stationary vane-wheel and a rotatable vane-wheel in such a manner that it is possible for them to slide towards and away from each other. Due to such a construction, there are the drawbacks that contact of the sluice gate with the rotatable vane-wheel is apt to occur, that corrosion occurs at respective specified parts of the sluice gates and the stationary vane-wheel, that an undesirably large space is required for receiving the sluice gates, and that a heavy duty handle must be operated for sliding the sluice gates. Furthermore, the Froude type dynamometer requires an additional feed-water pump for supplying the whole volume of the chamber inside the casing with water.

The object of this invention is to provide a hydraulic dynamometer free from such drawbacks as above. In accordance with this invention, the pair of sluice gates are eliminated so that the hydraulic dynamometer in accordance with this invention is free from drawbacks due to the sluice gate. A local and concentrated corrosion does not occur on the stationary vane-wheel by virtue of the fact that there is a stationary state of flow between the vane-wheels. In operation, it is only required to turn a light duty handle whereby a small rotary valve or a substitute is turned, while the Froude type hydraulic dynamometer requires operations of a heavy duty handle for operating the pair of sluice gates and, in addition, handles for operating the feed-water valve and an exhaust valve.

In accordance with this invention, due to the simplicity of the operation system, it is possible to provide remote-control of the dynamometer. While a minimum brake horsepower curve is substantially high in a hydraulic dynamometer of the Froude type, the value of the minimum brake horsepower of the hydraulic dynamometer in accordance with this invention becomes about a half of the former by virtue of such construction that, when a brake horsepower approaches the minimum curve, the quantity of liquid supplied into the casing is reduced automatically. While the value of brake horsepower to be measured by a hydraulic dynamometer of the Froude type is extremely small when the casing is rotated at a low velocity, it is possible to attach a band brake to a hydraulic dynamometer in accordance with this invention, so as to enlarge the value of brake horsepower to be measured when the casing is rotated at a low velocity.

Briefly stated in accordance with one aspect of this invention, there is provided a hydraulic dynamometer comprising a rotatable casing connected with a force measuring instrument so as to measure the turning effect, a chamber being formed inside the casing, a rotatable axially open vane-wheel being mounted in the chamber, a stationary axially open vane-wheel being formed on the axial wall of the chamber, the stationary axially open vane-wheel facing the rotatable axially open vane-wheel intermediate a narrow circular space, and a means of adjusting hydraulic pressure at the outermost and highest point within the space externally.

In a stationary state a hydraulic pressure based on a centrifugal force acting on a mass of liquid flowing between the stationary vane-wheel and the rotatable vane-wheel is in equilibrium up to a pressure at the above-stated outermost and highest point, (which is called G point infra for simplicity) within the narrow circular space between the two vane-wheels. Therefore, if the hydraulic pressure at the G point is increased, the quantity of the liquid flowing between the two vane-wheels may be increased by such an additional quantity that a pressure corresponding to the additional pressure may occur by the centrifugal force acting on the additional quantity of the liquid. When the hydraulic pressure at the G point becomes equal to atmospheric pressure, a quantity of the liquid being supplied into the chamber passes through the same without flowing between the two vane-wheels.

In order to adjust the hydraulic pressure at the G point, in accordance with this invention, a means therefor is provided, which comprises a pressure adjusting section of the chamber, which is communicated with the G point and provided with a throughput adjustable overflow port and/or a radially acting impeller. As a result of the adjustment of hydraulic pressure at the G point, the quantity of liquid refluxing between the two vane-wheels is adjusted. By virtue of the novel idea introduced into the torque adjusting method itself as above, the whole construction of the hydraulic dynamometer and operating means therefor are simplified substantially.

The invention will be better understood and other objects and additional advantages of the invention will become apparent upon perusal of the following description taken in connection with the drawings, in which.

Figures 1, 2, 3, 4, 5:
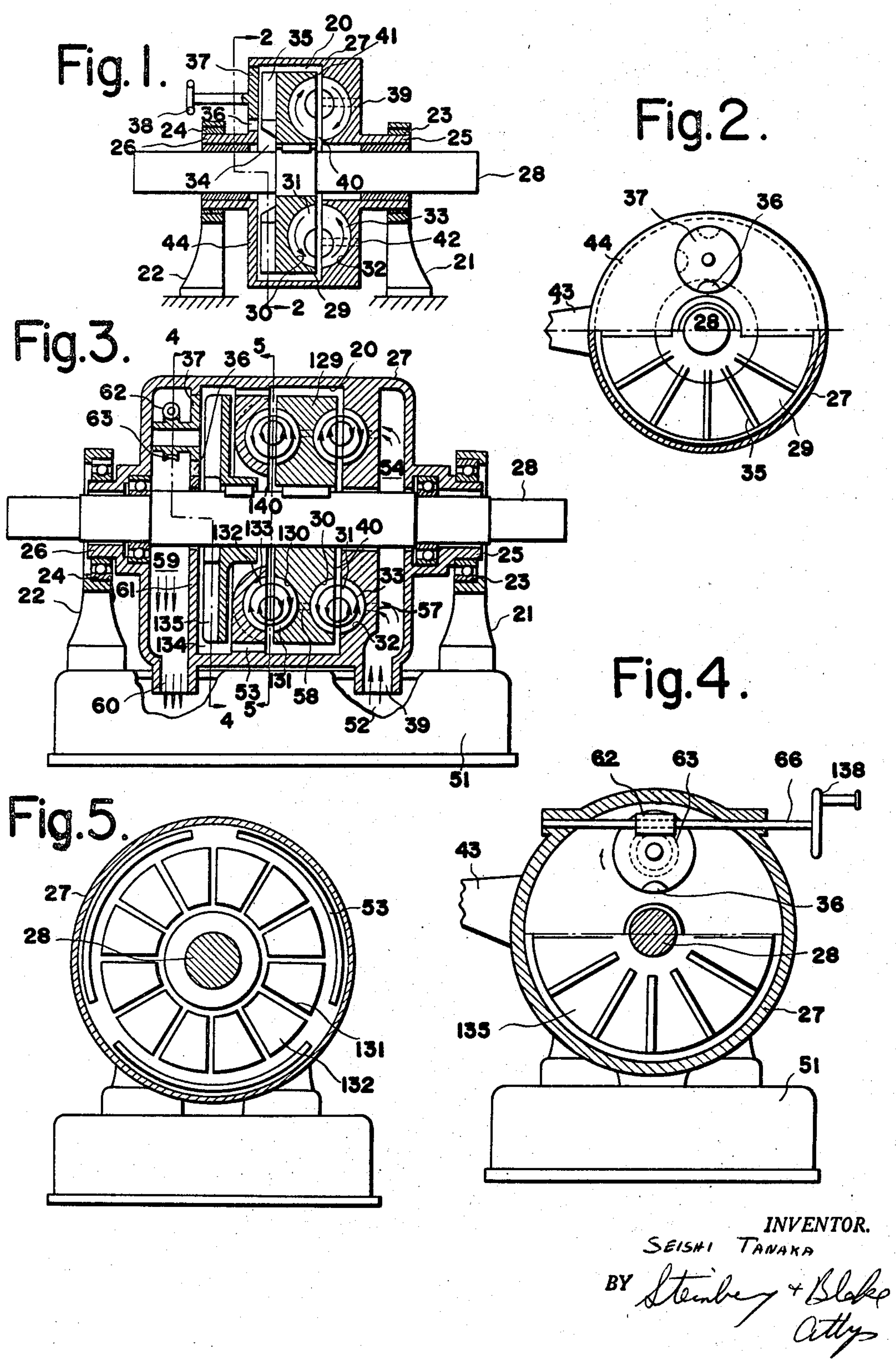
FIG. 1 is an axially sectional front elevational view of a simple embodiment of this invention.
FIG. 2 is a cross-sectional view taken along the line 2—2 of FIG. 1.
FIG. 3 is a similar view to FIG. 1 showing another embodiment of this invention.
FIG. 4 is a cross-sectional view taken along the line 4—4 of FIG. 3.
FIG. 5 is another cross-sectional view taken along the line 5—5 of FIG. 3.

Referring more particularly to the drawings, some embodiments of the invention will now be described; however, this description will be understood to be only illustrative of the invention and not as limiting it to the particular constructions shown and described. In an explanatory embodiment shown in FIG. 1, there are two stands 21 and 22, having bearings 23 and 24, respectively. Two bushing-like members 25 and 26 of a casing 27 are rotatably journalled thereby. A chamber 20 is provided inside the casing 27. A main shaft 28 is rotatably journalled by the two bushing-like members 25 and 26, extending through the casing 27 and the chamber 20 therein. A rotatable vane-wheel 29 is secured on the main shaft 28 and arranged in the chamber 20. A circular groove 30 is formed on an end transverse surface of the rotatable vane-wheel 29. The circular groove 30 is divided into a number of buckets by radial vanes 31. An inner, stationary wall of the chamber 20 facing wheel 29 is provided at its transverse surface with a circular groove 32 divided into a number of buckets by radial vanes 33 and directed toward and of the same diameter as the circular groove 30 of rotary vane-wheel 29 with a narrow space between wheel 29 and the circularly grooved surface of casing 27.

There is a pressure adjusting section 34 of the chamber 20 behind the rotatable vane-wheel 29. A number of radial blades 35 are arranged on the side of the rotatable vane-wheel 29 opposite vanes 31 so as to form an impeller inside the pressure adjusting section 34, as shown in FIG. 2. A round opening is formed through the end wall 44 of the chamber 20 facing the impeller blades 35. A disk 37 is supported rotatably within the round opening and provided with an overflow port 36 so as to form a rotary valve. It is preferred to locate the overflow port 36 in the periphery of the disk 37 with the shape of a semicircular notch. Upon turning of the rotary valve 37, externally by a handle 38, the liquid level in the radial direction inside the pressure adjusting section 34 may be adjusted. A liquid inlet 39 and air outlet 42 are provided so as to provide direct communication of the narrow space 40 with a liquid source (not shown) and the atmosphere, respectively. Reference numeral 41 indicates the G point described hereinbefore.

In operation, the chamber 20 is filled with a liquid, for example, water supplied through the liquid inlet 39. The water is admitted into the pressure adjusting section 34 through the peripheral space or annular gap surrounding the rotatable vane-wheel 29. The water may discharge out of the chamber 20 through the overflow port 36. However, the rotary disk with the overflow port 36 may be adjusted so that the water level inside the chamber 20 may be varied by operating the handle 38. A shaft, of which the turning effect is to be measured, is connected with the main shaft 28 as usual. When the main shaft 28 is rotated, the radial impeller blades 35 act so as to push the water radially outwards. By virtue of the action of the impeller blades 35, the hydraulic pressure at the G point 41 is heightened, so that the quantity of water flowing between the two circular grooves 30 and 32 is increased in opposition to the action of centrifugal force acting thereon. In order to adjust the action, the handle 38 is turned so as to turn the rotary valve 37. By turning the rotary valve 37, the overflow port 36 is lifted and lowered along a circular path. The casing 27, to which the torque is transmitted, is provided with an external protrusion 43 (FIG. 2) which is held by a force measuring instrument (not shown) as usual so as to indicate the torque in the instrument.

There is a base 51 which serves as a water reservoir 52. Two stands 21 and 22 extend upwards therefrom and are provided with two bearings 23 and 24. Two bushing-like members 25 and 26 of a casing 27 are adapted to be rotatably journalled by the bearings 23 and 24, respectively. A main shaft 28 is rotatably journalled by the bushing-like members 25 and 26 similarly to the preceding embodiment.

In this embodiment, there are two circular grooves 30 and 130 on both axial surface of a rotatable vane-wheel 129 secured on the main shaft 28, respectively. These circular grooves 30 and 130 are divided into many parts by radial vanes 31 and 131, respectively. Transverse walls of the chamber facing the rotatable vane-wheel 129 are provided with stationary circular grooves 32 and 132 divided into many parts by radial vanes 33 and 133 and arranged facing the rotatable circular grooves 30 and 130 across narrow spaces 40 and 140, respectively, as shown in FIG. 3.

By virtue of the above construction, a pressure adjusting chamber 134 corresponding to the pressure adjusting section 34 in the preceding embodiment is provided separate from the chamber 20 as shown in FIG. 3. The chamber 134 is arranged coaxially with the rotatably vane-wheel 129 inside the casing 27 and communicates with the chamber 20 through several passages 53 as shown in FIGS. 3 and 5. An impeller 135 is secured on the main shaft 28 and arranged inside the pressure adjusting chamber 134 as shown in FIGS. 3 and 4. By virtue of this impeller 135 provided with radial blades, the water contained in the pressure adjusting chamber 134 is pushed radially and therefore towards the chamber 20 through the passages 53 so as to keep the narrow space 40 between the stationary circular groove 32 and the rotary circular groove 30 and another narrow space 140 between the stationary circular groove 132 and the rotary circular groove 130 at higher pressure during rotation of the main shaft 28.

There is a cavity 54 on the right of the chamber 20 and inside the casing 27 having a water inlet 39 communicating with the inside of the reservoir 52. The four grooves 30, 130, 32 and 132 are supplied with water pumped from the reservoir 52 through the inlet 39, cavity 54, and passages 57 and 58. There is another cavity 59 on the left of the pressure adjusting chamber 134 inside the casing 27 having a water outlet 60. There is a rotary valve 37 having the overflow port 36 in a partition 61 provided between the pressure adjusting chamber 134 and the cavity 59 so as to provide an overflow for the pressure adjusting chamber 134. The rotary disk 37 is similar to disk 37 of the preceding embodiment, but a handle 138 is arranged in front of the casing 27 to provide a transmission comprising a worm 62 mounted on a worm shaft 66 connected to handle 138 and a worm wheel 63 on rotary disk 37, as shown in FIGS. 3 and 4.

Figures 6, 10:
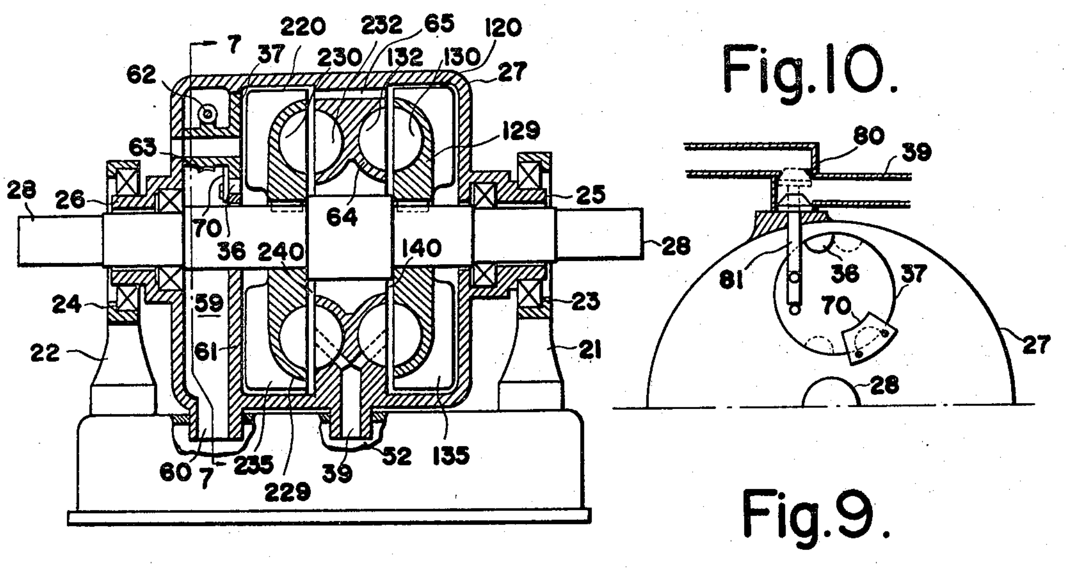
FIG. 6 is a still similar view to FIG. 1 showing still another embodiment of this invention.
FIG. 10 is a partly removed cross-sectional view showing a feed-liquid valve embodying this invention.
Figure 7:
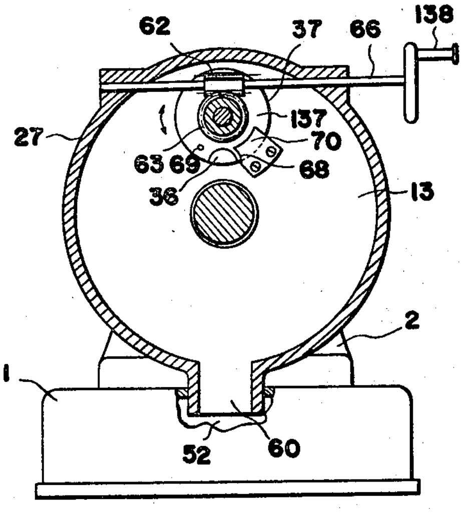
FIG. 7 is a cross-sectional view taken along the line 7—7 of FIG. 6.

Reference is now made to FIGS. 6 and 7, which illustrate the third embodiment of this invention. In this embodiment there are two chambers 120 and 220 arranged symmetrically inside a casing 27. A thick partition 64 is formed integrally with the casing 27 so as to divide the inside of the casing 27 into the two chambers 120 and 220. There are two rotatable vane-wheels 129 and 229. The arrangement of four circular grooves 130, 132, 230, and 232 is similar to that in the preceding second embodiment but the outer two circular grooves 130 and 230 are formed on the inside surface of the two rotatable vane-wheels 129 and 229 while the inner two circular grooves 132 and 232 are stationary ones formed on the outer surfaces of the partition 64 facing the two rotatable circular grooves 130 and 230, respectively.

There is no cavity corresponding to the cavity 54 in the preceding embodiment, but a water inlet 39 is positioned just under the thick partition 64 so as to feed two narrow spaces 140 and 240 between the four circular grooves 130, 132, 230, and 232 with water from the reservoir 52, respectively. In order to push water inside the two chambers 120 and 220, both outer surfaces of two rotatable vane-wheels 129 and 229 are provided with radial blades symmetrically in both pressure adjusting chambers 134 and 234 so as to form impellers 135 and 235, respectively. By virtue of this symmetrical twin arrangement of the two stationary and rotatable elements, disadvantageous axial thrusts acting on the main shaft 28 may be substantially equalized.

The overflow controlling system comprising a partition 61, an overflow port 36 formed in a rotary disk 37, a worm wheel 63, a worm 62 mounted on a worm shaft 66, a handle 138 fixed to the worm shaft 66, and a cavity 59 is quite similar to that in the preceding second embodiment but a means 70 is added thereto. The means 70 is a cover plate for the overflow port 36 and secured to the partition 61 in such a manner that, when the rotary valve 37 is turned by means of the handle 138 so as to bring the overflow port 36 across plate 70 the cover plate 70 gradually covers the effective cross-sectional area of the overflow port 36 so as to reduce the throughput, to heighten the level and hydraulic pressure inside the two chambers 120 and 220. Reference numeral 65 indicates passages provided between the two chambers 120 and 220 for communicating them with each other so as to equalize conditions therein.

It is preferred to provided a stop means comprising a stop pin 69 to cooperate with the cover plate 70. The stop pin 69 protrudes axially from a near-peripheral part of the outer surface of the rotary disk 37 so as to engage with the cover plate 70. The relative position of the stop pin 69 to the cover plate 70 is such that, when the overflow port 36 takes the lowermost position, it is exposed entirely and not overlapped with the cover plate 70, while, when the overflow port 36 has just passed the above position, the cover plate 70 begins to cover the overflow port 36, and that, when it has just been covered by the cover plate 70 completely, the stop pin 69 is brought into engagement with the edge of the cover plate 70 so as to restrict the further turn of the rotary valve 37.

Figure 9:
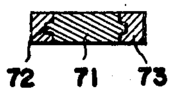
FIG. 9 is an enlarged cross-sectional view taken along the line 9—9 of FIG. 8.
Figure 8:
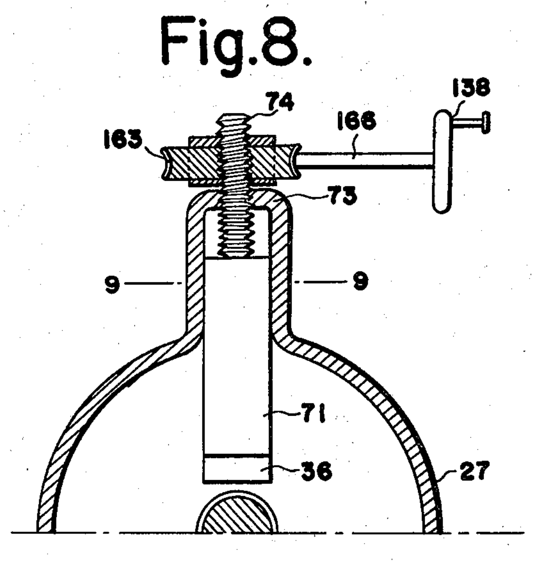
FIG. 8 is a partly removed cross-sectional view showing another level variable overflowing means embodying this invention.

Reference is now made to FIGS. 8 and 9, which illustrate another means for adjusting the overflow port 36. In this embodiment, a vertically slidable valve is substituted for the rotary valve 37. The vertically slidable valve comprises a rectangular valve plate 71 adapted to be vertically slidable being guided by a dovetail structure 72 provided inside a boss 73 of the casing 27 so as to cover and check the overflow port 36 as the valve plate 71 is lowered. The valve plate 71 has an upstanding screw 74 secured thereto and protruded upwards out of the top of the boss 73. A worm wheel 163 has an internally threaded hole adapted to engage with the upstanding screw 74 and is arranged on the boss 73 in such a manner as being rotatable but not vertically slidable. A worm formed on one end of a worm shaft 166 is adapted to engage with the worm wheel 163 so as to drive the worm by a handle 138 mounted on the other end of the worm shaft 166, ending in to drive the valve plate 71 by the handle 138.

Reference is now made to FIG. 10, which illustrates a means for adjusting the input of water into the casing 27. Water to be admitted into the casing 27 is made to pass a valve 80, which a valve rod 81 is connected with the rotary valve 37 or the vertically slidable valve plate 71 in such a manner that, when the rotary valve 37 or the valve plate 71 approaches the highest position so as to exhaust the water contained in the chamber 20 or chambers 120 and 220, the valve 80 is closed gradually so as to reduce the input. At last a fan braking state is brought about.

Figures 11, 12, 13:
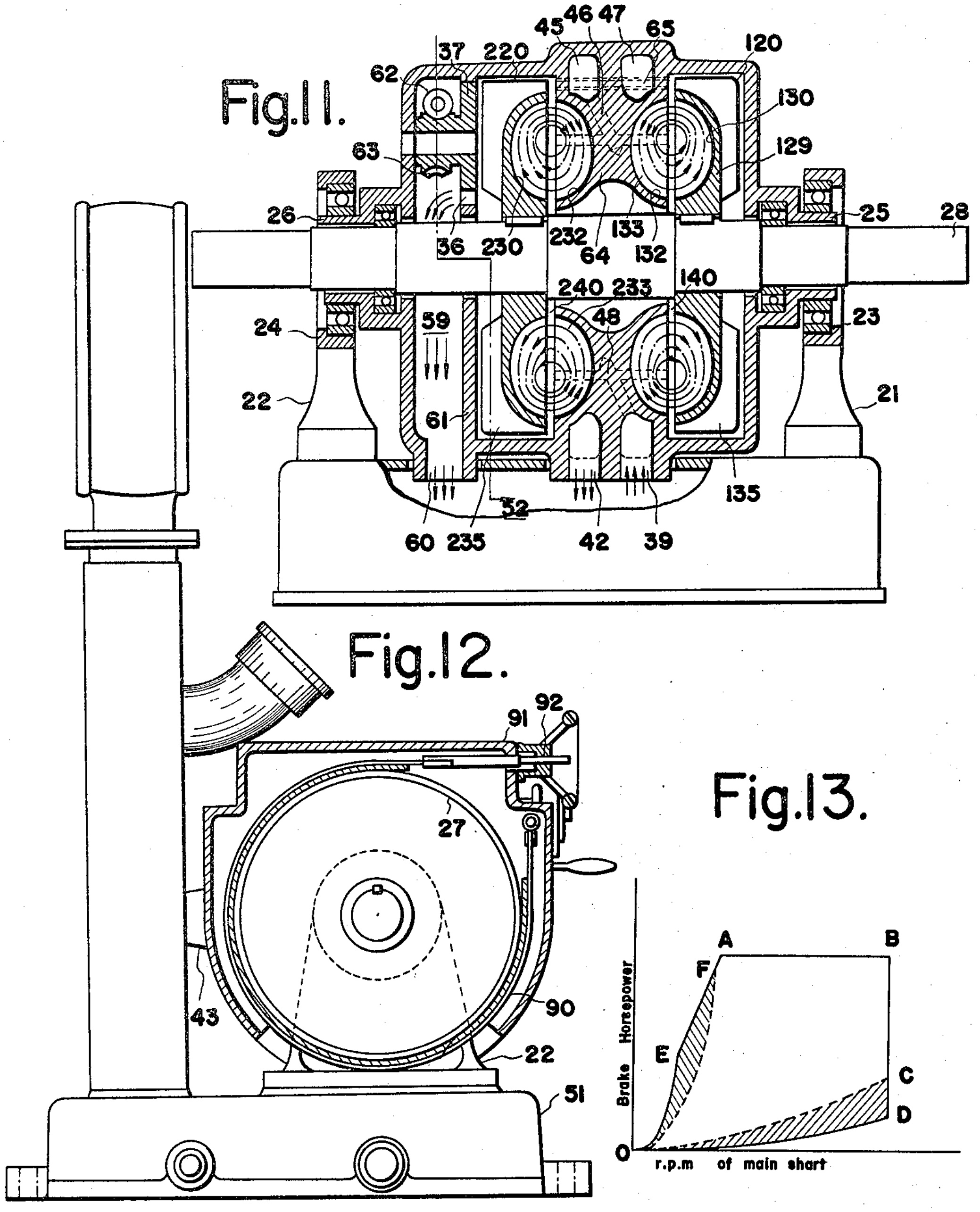
FIG. 11 is a similar view to FIG. 1 showing further another embodiment of this invention.
FIG. 12 is a partly removed cross-sectional view showing a band-braking means of the invention.
FIG. 13 is a graph illustrating characteristics of the hydraulic dynamometer in accordance with this invention.

Reference is now made to FIG. 11, which illustrates still another embodiment similar to that shown in FIG. 6. In this embodiment, however, there are provided not only a water inlet 39 but also an air outlet 42 in the thick partition 64. The water inlet 39 leads to a ring-shaped liquid passage 47 and the air outlet leads to a ring-shaped air passage 45 provided inside the thick partition 64 coaxially with the main shaft 28. The ring-shaped liquid passage 47 is branched into T-shaped liquid passages 48, each having two axial ends opening into the narrow spaces 140 and 240 through the central parts of the insides of the alternate radial vanes 133 and 233, respectively. The ring-shaped air passage 45 is similarly branched into T-shaped air passages 46, each having two axial ends opening into the narrow spaces 140 and 240 through the central parts of the insides of the other alternate radial vanes 133 and and 233, respectively. The air outlet 42 provided in this embodiment and also in the first embodiment serves to communicate the narrow space 40 or narrow spaces 140 and 240 directly with the atmosphere so as to prevent a reduced pressure. When the overflow port 36 is closed, the chamber 20 or chambers 120 and 220 are filled with water supplied from the reservoir 52 through the water inlet 39, ring-shaped liquid passage 47, and T-shaped liquid passages 48. The water overflows the chamber 20 or chambers 120 and 220 to the reservoir 52 through the T-shaped air passages 46, ring-shaped air passage 45, and the air outlet 42.

Reference is now made to FIG. 12, which illustrates a band braking means. In this embodiment, about three quarters of the periphery of the casing 27 is surrounded by a band brake 90. One end of the band brake 90 is anchored to an outer frame 91 while the other end of the band brake 90 is adapted to be pulled towards the outer frame 91 by a screwing means 92 so as to subject frictional resistance to the rotatable casing 27. By virtue of this band braking means, it is possible to amplify the brake horsepower easily when the main shaft 28 is rotated at a low velocity.

FIG. 13 is a graph illustrating characteristics of the hydraulic dynamometers in accordance with this invention as shown in FIGS. 1, 2, 6, 7 and 10, in which the abscissa represents the rotation (r.p.m.) of the main shaft 28 while the ordinate represents the brake horsepower. The left triangular area (ΔOEF) is obtained by adjusting the overflow by covering the overflow port 36 by the cover plate 70. The lower triangular area (ΔOCD) is obtained by adjusting the feed by restricting the input of water through the valve 80. For the intermediate area (OFABCO) between these two areas, it is required to adjust the water level inside the chamber 20 or chambers 120 and 220. The leftmost curve (AO) represents the maximum brake horsepower. The lowermost curve (OD) represents the minimum brake horsepower.

It is apparent from the above description that in all of the embodiments of the invention there is an outer casing and a rotary shaft extending through the outer casing, this outer casing having at least one wall provided with one surface extending transversely with respect to the rotary shaft and formed with an annular groove coaxially surrounding the rotary shaft and carrying the transverse vanes which form buckets in this groove, the shaft itself carrying at least one rotary disk for rotation therewith and having a transverse surface separated from the transverse wall surface of the casing by a narrow space. This transverse disk surface is formed with an annular groove facing the annular groove of the wall surface and being of the same diameter as the latter while also co-axially surrounding the shaft, and the groove of the disk is provided with the radial vanes which divide it into a plurality of buckets so that in this way the buckets of these transverse surfaces form chambers in which fluid can circulate. Each embodiment also includes a rotary impeller means, formed, for example, by the blades 35 of FIG. 1 or the impeller 135 of FIG. 3, and this rotary impeller means communicates with the outer annular gap defined between the periphery of the disk which is fixed to the rotary shaft and the inner surface of the casing, while the rotary disk 37 with its notch 36, or the slidable valve plate 71, form an overflow means communicating with the impeller of each embodiment at the region where the impeller communicates with this annular gap at the outer periphery of the disk which is fixed to the rotary shaft. A liquid inlet communicates with the space defined between the annular grooves to supply liquid thereto, and as a result of centrifugal force this liquid tends to flow out through the annular gap to the impeller means and the overflow means, and the rotary movement of the impeller means resists this flow of the liquid out of the annular grooves, so that a balance is achieved, and the pressure of the liquid which is thus maintained in balance is regulated by adjustment of the overflow means.

While particular embodiments of the invention have been illustrated and described, modifications thereof will readily occur to those skilled in the art. It should be understood therefore that the invention is not limited to the particular arrangements disclosed but that the appended claims are intended to cover all modifications which do not depart from the true spirit and scope of the invention.

What is claimed as new and desired to be secured by Letters Patent of the United States is:

1. In a hydraulic dynamometer, a rotary shaft, an outer casing surrounding and turntable with respect to said shaft, said casing having at least one wall having an inner surface extending transversely with respect to and surrounding said shaft and formed with an annular groove surrounding said shaft and provided in its interior with vanes dividing said groove into buckets, a rotary wheel fixed to said shaft within said casing for rotation with said shaft and having a wheel surface situated adjacent but separate from said wall surface and defining therewith a narrow space communicating with an outer annular gap surrounding said wheel and defined between the periphery of the latter and an inner surface of said casing, said wheel surface being formed with an annular groove of the same diameter as and facing said wall surface groove and also provided with vanes which divide said wheel groove into buckets, so that said grooves communicate with each other to provide for circulation of a liquid therein, rotary impeller means fixed to said shaft for rotation therewith and having an outer peripheral portion communicating with said annular gap, liquid inlet means communicating with the space defined between said annular grooves to supply liquid thereto, so that the liquid tends to flow out through the annular gap to the peripheral portion of said impeller means where the flow of liquid away from said annular grooves is resisted by the centrifugal force provided by said impeller means, and adjustable overflow means communictiang with said impeller means for discharging therefrom the liquid which reaches said impeller means from said gap, so that said adjustable overflow means can be adjusted for controlling the presence of the liquid situated between said grooves and said impeller means in said gap.

2. The combination of claim 1 and wherein said overflow means has an overflow port and adjusts the distance of said port from the axis of said shaft.

3. The combination of claim 2 and wherein said casing has a wall defining part of a chamber in which said impeller means is located and extending transversely with respect to said shaft, said latter wall being formed with an opening, and said overflow means including an adjustable member located at said opening of said latter wall for movement with respect thereto to adjust the distance of said port from said shaft axis.

4. The combination of claim 3 and wherein said adjustable member of said overflow means is in the form of a radially movable plate, said opening forming said port and being overlapped by said plate, and the position of said plate with respect to said opening determining the distance of said port from said shaft axis.

5. The combination of claim 3 and wherein said opening is of circular configuration and said adjustable member of said overflow means is in the form of a rotary disk turnable in said opening and having a peripheral notch forming said port.

6. The combination of claim 5 and wherein said wall which is formed with said opening which receives said disk carries a covering plate which overlaps the periphery of said disk so that said notch which forms said port can overlap said covering plate to a given extent during turning of said disk.

7. The combination of claim 6 and wherein said disk carries a stop pin which engages said covering plate when said notch is entirely overlapped by the latter.

8. The combination of claim 1 and wherein said liquid inlet means includes an inlet valve for controlling the rate of liquid supply, and means connecting said valve to said overflow means for adjusting said valve simultaneously with the adjustment of said overflow means.

9. The combination of claim 8 and wherein said valve is adjusted to reduce the rate of liquid feed as the extent of overflow is reduced by said adjustable overflow means.

10. The combination of claim 1 and wherein said impeller means includes impeller blades fixed to said rotary wheel at a face thereof which is directed away from said wheel surface which is formed with said groove, so that said impeller means forms a unitary construction and rotates with said rotary wheel.

11. The combination of claim 1 and wherein said impeller means includes an impeller distinct from and axially spaced along said shaft from said wheel.

12. The combination of claim 1 and wherein a pair of said wheels are axially spaced along and fixed to said shaft for rotation therewith, said casing having said wall extending between said wheels and formed at its opposed transverse wall surface with said wall surface grooves, said wheels being formed at their wheel surfaces which are directed toward said wall with said grooves.

13. The combination of claim 12 and wherein said impeller means includes a plurality of impeller blades fixed to each of said wheels at a surface thereof which is directed away from said wall.

14. The combination of claim 12 and wherein said wall is formed with a T-shaped passage communicating with said grooves of said wall for supplying liquid thereto.

15. The combination of claim 14 and wherein said wall is formed with an additional T-shaped passage communicating with said wall grooves for exhausting air therefrom.

16. The combination of claim 1 and wherein a band braking means surrounds and frictionally engages said casing for providing frictional resistance to turning thereof with said shaft.

References Cited

UNITED STATES PATENTS

| | | | |
|---|---|---|---|
| 1,854,952 | 4/1932 | Nilson | 73—134 XR |
| 2,341,122 | 2/1944 | Schmidt | 188—90 |

RICHARD C. QUEISSER, *Primary Examiner.*

C. A. RUEHL, *Examiner.*